United States Patent
Srinivasan et al.

[11] Patent Number: 6,128,610
[45] Date of Patent: Oct. 3, 2000

[54] INDEX WITH ENTRIES THAT STORE THE KEY OF A ROW AND ALL NON-KEY VALUES OF THE ROW

[75] Inventors: Jagannathan Srinivasan, Nashua; Samuel De Fazio, Hollis, both of N.H.; Anil Nori, San Jose, Calif.; Souripriya Das, Nashua, N.H.; Chuck Freiwald, Milford, N.H.; Jayanta Banerjee, Nashua, N.H.

[73] Assignee: Oracle Corporation, Redwood Shores, Calif.

[21] Appl. No.: 09/139,526

[22] Filed: Aug. 25, 1998

Related U.S. Application Data

[62] Division of application No. 08/677,159, Jul. 9, 1996, Pat. No. 5,893,104.

[51] Int. Cl.[7] .................................................. G06F 17/30
[52] U.S. Cl. ................................................ 707/3; 707/100
[58] Field of Search ........................... 707/1–5, 100–103, 707/201–205

[56] References Cited

U.S. PATENT DOCUMENTS 5,752,243  5/1998  Reiter et al. ................................ 707/3
5,761,493  6/1998  Blakeley et al. ............................ 707/4

OTHER PUBLICATIONS

Cattell, R.G.G., Sun Microsystems, Inc., "Object Data Management: Object–Oriented and Extended Relational Database Systems," Revised Editon, Addison–Wesley Publishing Company, pp. 82–83, 221–223, 229–230, Aug. 1994.

*Primary Examiner*—Paul R. Lintz
*Assistant Examiner*—Hosain T. Alam
*Attorney, Agent, or Firm*—McDermott, Will & Emery

[57] ABSTRACT

A method and apparatus for efficiently storing and retrieving data in a database using index-only tables is disclosed. Storing a row of data in a database using index-only tables involves storing in a leaf node an index entry that includes a key value along with all other values in the row of data. If the row of data exceeds a predetermined size, then a portion of the row of data is stored in a user specified overflow area. Retrieving a row of data from an index-only table for a user-supplied key involves identifying a leaf node for the key, and reading a row of data from the index entry and any remaining portion from the overflow area when the row exceeds the predetermined size.

24 Claims, 2 Drawing Sheets

INDEX WITH ENTRIES THAT STORE THE KEY OF A ROW AND ALL NON-KEY VALUES OF THE ROW

This is a division of application Ser. No. 08/677,159, entitled "METHOD AND SYSTEM FOR PROCESSING QUERIES IN A DATABASE SYSTEM USING INDEX STRUCTURES THAT ARE NOT NATIVE TO THE DATABASE SYSTEM", filed by Srinivasan, et al. on Jul. 9, 1996, now U.S. Pat. No. 5,893,104.

FIELD OF THE INVENTION

The present invention relates to database systems, and more specifically, to a method and apparatus for supporting index-only tables.

BACKGROUND OF THE INVENTION

In typical database systems, users store, update, and retrieve information by interacting with user applications ("clients"). The clients respond to the user's interaction by submitting commands to a database application responsible for maintaining the database (a "database server"). The database server responds to the commands by performing the specified actions on the database. To be correctly processed, the commands must comply with the database language that is supported by the database server. One popular database language is known as Structured Query Language (SQL).

Various access methods may be used to retrieve data from a database. The access methods used to retrieve data may significantly affect the speed of the retrieval and the amount of resources consumed during the retrieval process. Many access methods use indices to increase the speed of the data retrieval process. Typical database management systems have built-in support for a few standard types of access methods, such as access methods that use B+Trees and Hash Tables, that may be used when the key values belong to standard sets of data types, such as numbers, strings, etc. The access methods that are built-in to a database system are referred to herein as native access methods.

In recent years, databases are being used to store different types of data, such as text, spatial, image, video, and audio data. For many of these complex data types, the standard indexing techniques and access methods cannot readily be applied. To provide efficient data retrieval, many database systems that allow users to store complex data types attempt to provide access methods suitable for the complex data types. For example, R-trees are an efficient index mechanism for indexing spatial data. Therefore, a database system that allows users to store spatial data may include built-in support for R-tree access methods. However, attempts to provide native support for all types of access methods are unrealistic because it is not possible to foresee all possible types of complex data that clients may wish to store in a database, much less all types of access methods that one may wish to use with such data types.

According to one approach, clients may be designed to provide their own indexing mechanisms for data types that cannot use the native access methods of the database system. For example, assume that the native access methods of a database server do not include R-tree access methods. A client that uses spatial data would use the database server to store the spatial data in the database, but would maintain an R-tree index structure outside the database. The client would be responsible for maintaining and using the R-tree index outside of the database system environment, while the spatial data itself is maintained within the database environment.

Unfortunately, storing an index outside a database for data that is stored within a database has several significant disadvantages. Specifically, it is difficult to maintain consistency between external indices and the related relational data, support compound queries (involving tabular values and external indices), and to manage a system (backup, recovery, allocate storage, etc.) with multiple forms of persistent storage (files and databases).

Based on the foregoing, it is clearly desirable to provide a database server that supports arbitrary, user-defined data types. It is further desirable to provide a database server that may be extended to support non-native access methods while maintaining the index structures for the non-native access methods within the database itself.

SUMMARY OF THE INVENTION

A method and apparatus for efficiently storing and retrieving data in a database using index-only tables is provided. For storage, the method involves receiving a row of data from a client, identifying a key value in the row of data, and identifying a leaf node in an index based on the key value. Once the leaf node is identified, an index entry that includes the key value and all other values in the row of data are stored in the leaf node. The leaf node resides on a block of a storage device. If the row of data exceeds a predetermined size, then a portion of the row of data is stored in an overflow area. For retrieval, the method involves identifying a leaf node in an index based on a user-supplied key, and reading a row of data from the index entry and any remaining portion from the overflow area when the row exceeds the predetermined size.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for supporting user-defined index structures and access methods within a database server are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
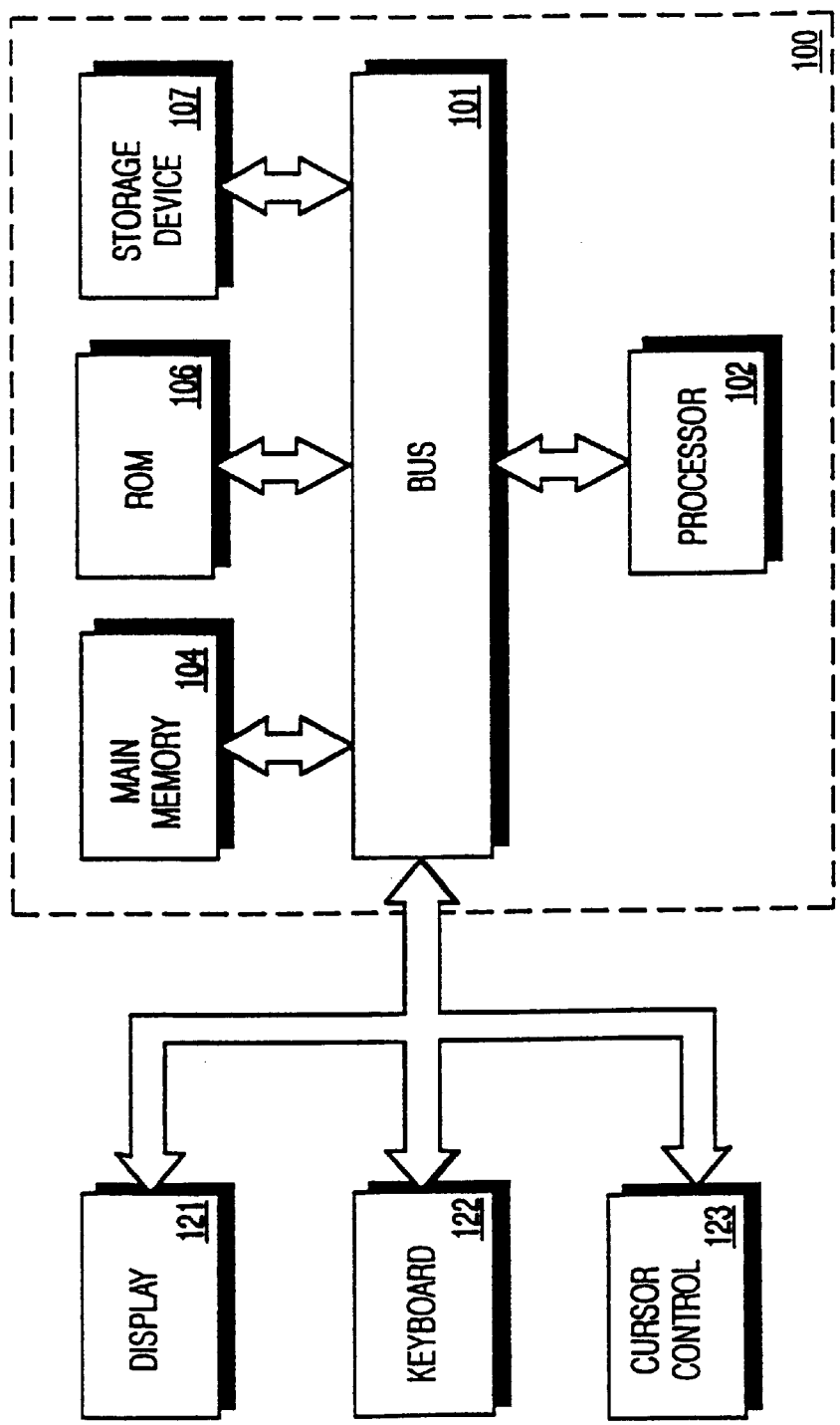
FIG. 1 is a block diagram of a computer system on which an embodiment of the present invention may be implemented.

Referring to FIG. 1, it is a block diagram of a computer system 100 upon which an embodiment of the present invention can be implemented. Computer system 100 comprises a bus 101 or other communication means for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

The present invention is related to the use of computer system 100 to execute a database server that provides support for non-native access methods. According to one embodiment, computer system 100 performs the processes that will be described hereafter in response to processor 102 executing sequences of instructions contained in memory 104. Such instructions may be read into memory 104 from another computer-readable medium, such as data storage device. In alternative embodiments, hard-wired circuitry may be used in place of or in combination with software instructions to implement the present invention. Thus, the present invention is not limited to any specific combination of hardware circuitry and software.

EXTENSIBLE INDEXING

As mentioned above, efficient access to new types of complex data may require the use of access methods for which the database server does not have built-in support. According to an embodiment of the invention, a database system is provided in which the responsibility for building, maintaining and interpreting non-native indices is shared between a domain expert that designs the access methods for the non-native index type and the database server. The software provided by the domain expert registers index routines with the database system to extend the indexing capabilities of the database server beyond those built-in to the database system. Indices that are managed by routines supplied in this manner are referred to herein as index objects (since they are instances of the newly defined index types).

Generally, the domain expert creates routines that control the structure and semantic content of a non-native index type ("index routines"), while the database server interacts with the index routines to build, maintain, and employ index objects of the non-native index type. More specifically, each index key of the index object has an associated data segment. The data segment for each index key is constructed and maintained by the index routines, and is of variable size. The index routines are responsible for interpreting the content of the data segment.

The index routines may maintain the data segments of an index object either within the database or external to the database. Embodiments in which the data segments are stored within the database may take advantage of the additional functionality provided by the database server. Embodiments in which the data segments are stored as index-only tables within the database are described in greater detail below.

THE DATABASE SERVER

To build and manage a standard index on a table, the database server invokes certain built-in routines. When database server receives queries that reference a table on which the index has been created, the database server can invoke built-in routines to use the index to efficiently process the queries. The operation of the database server is the similar for non-native index types as it is for standard indices, with the difference that the routines invoked by the database server are not built-in, but are external routines that are registered with or "plugged into" the database server.

According to one embodiment of the invention, the database server assumes that all non-native index types will support a certain set of index routines. These routines perform the same functions and have a similar interface as the built-in routines called by the database server for native access methods. Because the database server knows the names and parameters of the routines that will manage index objects of the non-native index types, the database server can invoke the appropriate index routines in response to commands received from a client.

The index routines include routines that create or delete index objects (Data Definition Language "DDL" routines), routines that update existing index objects (Data Manipulation Language "DML" routines), and routines that retrieve data from existing index objects (Query Processing "QP" routines).

According to one embodiment of the invention, the index routines include the following routines:

PROCEDURE i_create(iargs Iargs, parms VARCHAR2 (1024));

PROCEDURE i_drop(iname VARCHAR(30));

PROCEDURE i_truncate(iname VARCHAR(30));

PROCEDURE i_insert(iargs Iargs, rowid ROWID, newval Ivals);

PROCEDURE i_delete(iargs Iargs, rowid ROWID, oldval Ivals);

PROCEDURE i_update(iargs Iargs, rowid ROWID, oldval Ivals, newval Ivals);

FUNCTION i_open(iargs Iargs, opinfo Iops) RETURN Ihdl;

PROCEDURE i_start(ihdl Ihdl);
FUNCTION i_fetch(ihdl Ihdl, ancdata OUT VARRAY(30) OF TYPEANY) RETURN ROWID;
FUNCTION i_joinfetch(ihdl Ihdl, ancdata OUT VARRAY(30) OF TYPEANY) RETURN VARRAY(2) OF ROWID;
PROCEDURE i_close(ihdl Ihdl);

In the exemplary index routine definitions listed above, parameters of types Iargs, Ivals, Iops, and Ihdl are used by some of the methods. Those parameter types may be defined as follows:

CREATE TYPE Iargs
(
Iname VARCHAR(30),—Index object Name
Iobjnum NUMBER,—Unique Index Instance Number
Isname VARCHAR(30),—Schema containing the index
Tabname VARCHAR(30),—Indexed Table Name
Tabsname VARCHAR(30),—Schema containing the table
Colname VARRAY(30) OF VARCHAR(30),—Names of indexed columns
Coltype VARRAY(30) OF VARCHAR(30)—Types of indexed columns
);
CREATE TYPE Ivals
(
Numval NUMBER,—Number of values
Val VARRAY(30) OF TYPE ANY—Array of values
);
CREATE TYPE Iops
(
Opname VARCHAR(30),—Indexed Operator name
Opsname VARCHAR(30),—Schema containing the operator
Numargs NUMBER,—Number of arguments to the operator
Opargs VARRAY(30) OF TYPEANY,—Argument values
Opmode NUMBER—Operator mode: 1=selection, 2=join
);
CREATE TYPE Ihdl
(
state NUMBER—user maintained state
);

The exemplary list of routines includes three DDL routines: i_create, i_drop, and i_truncate The database server calls the i_create procedure of an index object when a CREATE INDEX statement is issued that references a non-native index type. Upon invocation, the database instance passes to the appropriate routine any physical parameters that are specified in the related CREATE INDEX . . . PARAMETERS ( . . . ) statement. The iargs argument contains the index name, the table name on which the index is defined, and descriptions of the columns or Abstract Data Type (ADT) attributes over which the index is defined.

The i_create routine can also be invoked to perform bulk loading of index objects. If the table with the indexed column(s) is not empty, the i_create routine scans the table and builds the index structures for all the existing rows.

The i_drop procedure of an index object is invoked by the database server when an index object is destroyed using a DROP INDEX statement. The iname argument contains the name of the index object to be dropped.

The i_truncate procedure of an index object is called by the database server when a TRUNCATE statement is issued against a table that contains a column or ADT attribute indexed using a non-native index type. After this procedure executes, the index object definition should be empty but remain intact. The iname argument contains the index object name.

The exemplary routines listed above also define three DML routines that are invoked to insert, update, and delete entries from an index object. Specifically, the database server invokes the i_insert routine of an index object when a record is inserted in a table that contains columns or ADT attributes indexed by the related index object. Upon invocation, the iargs argument contains the index name, the table name on which the index is defined, and descriptions of the columns or ADT attributes over which the index is defined. The newval argument contains an array of values of indexed columns.

The i_delete procedure of an index object is called by the database server when a record is deleted that contains columns or ADT attributes indexed by the related index object. The index name, table name, and descriptions of the indexed columns or ADT attributes are contained in the iargs argument. The oldval argument contains an array of values of indexed columns.

The i_update procedure of an index object is called by the database server when a record is updated that contains columns or ADT attributes indexed by the related index object. Upon invocation, the iargs argument contains the index name, the table name on which the index is defined, and descriptions of the columns or ADT attributes over which the index is defined. The oldval and newval arguments point to old and new column data.

The routines i_open, i_close, i_start, and i_fetch are routines that are invoked by the database server during query processing. Specifically, i_open is called by the database server to begin processing a query on a table that has an index object. The arguments passed to the i_open routine contain information related to the index and information about the operator specified in the query. The index related information includes the name of the index and its unique object number. The operator information provides the name of the indexed operator and the values of the arguments with which the operator is being invoked by the system.

The i_open function returns a handle of type Ihdl, which is subsequently passed in as an argument to the i_fetch, i_start and i_close routines. The handle can be used to store some state defined by the index object. The handle is not interpreted by the database server and is for use only by the software that manages the index object. A typical usage of the handle is to store the memory address for the per-invocation state object maintained by the index object.

The database server calls the i_close routine at the end of query processing. To execute the same query multiple times without opening and closing, the database server calls the i_start routine. The i_start routine resets the state of the index object to the start of query processing.

The database server calls the i_fetch routine to return rows that satisfy the indexed operator. The indexed operator can be supported in either the selection mode or the join mode. The selection mode allows selection of qualifying rows from one base table. The join mode operator performs the join of two base tables. According to one embodiment, the i_fetch routine returns unique identifiers ("rowids") of all the rows for which the indexed operator evaluates to TRUE. Each call to i_fetch returns a single rowid along with the ancillary data output values. Thus, the i_fetch routine does not return the rows for which the indexed operator evaluates to FALSE (or NULL). The i_fetch returns a NULL rowid to indicate that all the qualifying rows have been returned.

The i_joinfetch routine does not have to be specified if the index object does not support the join modes of any of its indexed operators. However, if an operator is supported in the join mode, the i_joinfetch routine returns a pair of rowids along with the ancillary data output values. The end of fetch is indicated by returning NULL rowids.

The fetch routines may be EXACT or INEXACT with respect to each of the indexed operators. If a fetch routine is EXACT with respect to an indexed operator, then the set of rows returned are exactly those that satisfy the operator. In an INEXACT implementation of an indexed operator, the returned rows are a superset of the actual result. In this case, the system applies a "secondary filter" before returning the rows to the user. This secondary filter is the non-indexed implementation of the operator, which is guaranteed to be exact. For example, the spatial index may support an operator "Overlaps" that determines if two geometries overlap one another. The implementation of the indexed operator may be approximate in that it may sometimes return non-overlapping geometries. The secondary filter is applied by the system to reject such rows.

The index routines specified above are merely exemplary of the type of routines that would be supported by non-native index types. The actual routines that the database server expects a domain expert to implement for an index type may vary from implementation to implementation. For example, the index routines may include a fetch routine that returns multiple rows at a time. For example, the i_fetch routine may alternatively be defined as:

FUNCTION i_fetch(ihdl Ihdl, ancdata OUT VARRAY (60) OF TYPEANY, numrows OUT NUMBER) RETURN VARRAY(2) OF ROWID;

where the actual number of rows being returned is specified through the numrows parameter. If the i_fetch routine returns more than one result row at a time, the number of calls the database server will have to make to the i_fetch routine will be significantly reduced. The reduction in the number of invocations can result in considerable performance gains. A similar technique can be used to improve the performance of the i_joinfetch routine.

QUERY PROCESSING EXAMPLE

To illustrate how a database server may process a query, assume that a client has created a table "Emp" that includes a Name column, an Id column, and a Resume column. Assume also that the table Emp has the following rows:

| Name | Id  | Resume                       |
|------|-----|------------------------------|
| Jags | 100 | Works at Oracle              |
| John | 101 | Knows Unix                   |
| Ravi | 102 | Experience with Oracle rdbms |

Assume that the client has created a text index on the Resume column. The text index is an index object that is accessed through routines supplied by a domain expert.

To evaluate the query: SELECT * FROM Emp WHERE Contains(resume, 'Oracle');, the database server may invoke the query processing routines as follows.

```
hdl = i_open();  /* Passes in contains operators and arguments */
                 /* gets back a handle */
for (;;)  {
        i_start(hdl);/* Starting to access rows */
        for (;;)  {
                rownum = i_fetch(hdl);/* returns the rowids */
                if(!rownum)break;/* All rows done */
                /* Process rownum */
        }
        if(! re_execute)break;       /* Check if the query needs to be
                        reexecuted ? */
}
i_close(hdl);
```

In the present example, the calls to i_fetch will successively return rows 1, 3, NULL. A query can be executed multiple times before closing the handle.

THE DOMAIN EXPERT

Before a non-native index type can be used, the index routines for the non-native index type must be created, and the database server must be made aware of the non-native index type and the location of its associated routines. The designer of the index routines is referred to herein as a "domain expert".

Figure 2:
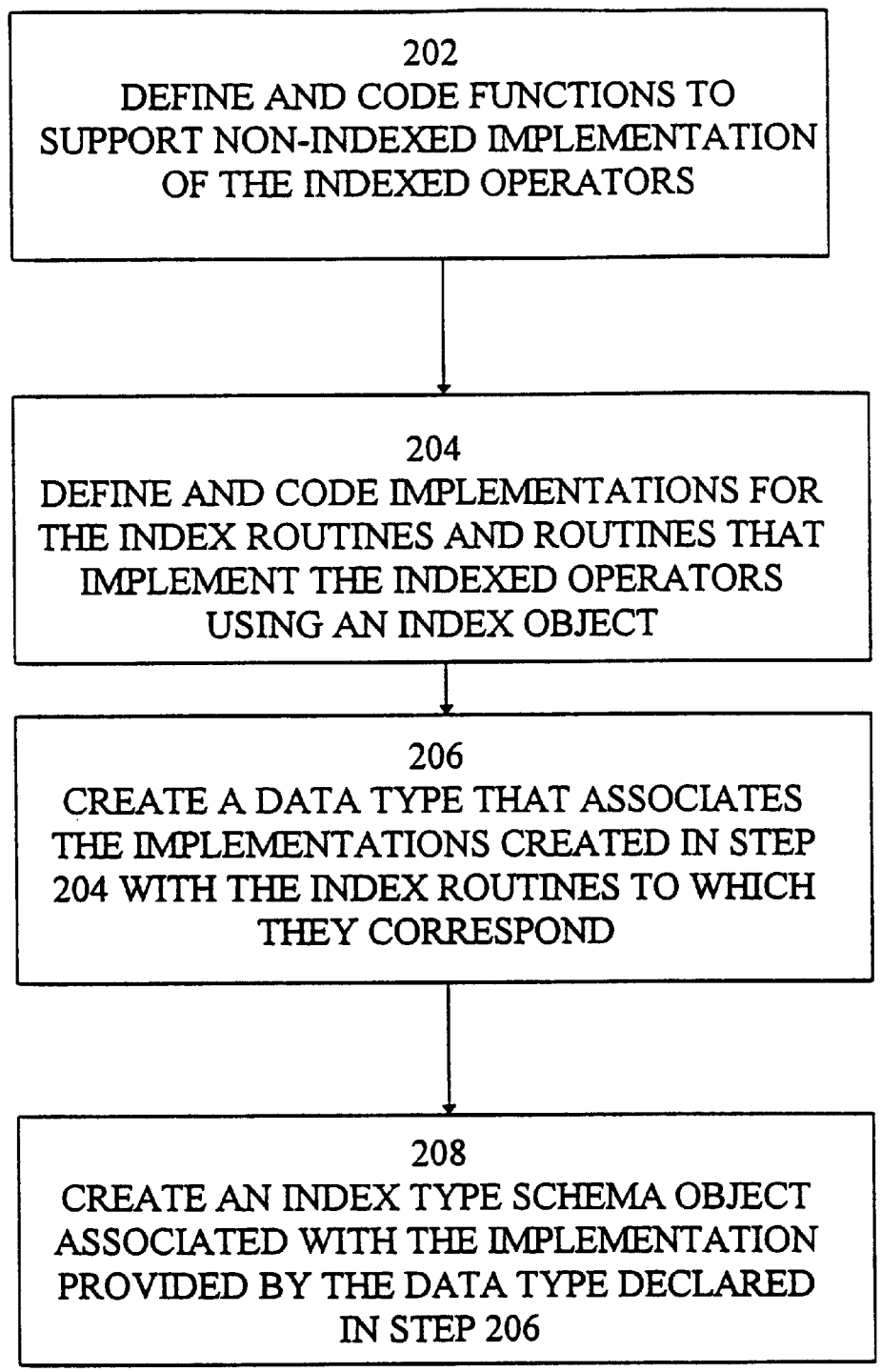
FIG. 2 is a flow chart illustrating the steps performed by a domain expert according to an embodiment of the invention.

FIG. 2 is a flow chart illustrating the steps performed by the domain expert to design a non-native index type according to one embodiment of the invention. As a preliminary step, the domain expert must decide which operators will be supported by the non-native index type. For example, the text index may support the operator "Contains", while a spatial index may support the operator "Overlaps". The operators supported by a non-native index type are referred to herein as indexed operators.

Referring to FIG. 2, at step 202 the domain expert defines and codes functions to support non-indexed implementations of the indexed operators. The non-indexed implementation of the indexed operators can be coded as stand alone functions in the database language supported by the database server (e.g. PL/SQL), as a packaged functions, or as Abstract Data Type ("ADT") methods.

According to one embodiment of the invention, the functions that implement the indexed operators must satisfy certain requirements. Specifically, all indexed operators must return Boolean values. The only valid return values are TRUE and FALSE. The parameters to the indexed operator are one or more TN parameters followed by zero or more OUT parameters. When the indexed operator returns FALSE, the values of each of the OUT parameters are set to NULL. The non-indexed implementation of indexed operators is essential because the system will not be able to use the index to evaluate the operator in all cases.

For the purposes of explanation, it shall be assumed that a domain expert is developing a client that will use a text-based index that supports an operator "Contains" that takes as parameters a text value and a key and returns a Boolean value indicating whether the text contained the key. Assuming that the database server supports the PL/SQL database language, the non-indexed implementation of the Contains operator may be defined as:

```
CREATE FUNCTION Contains(Text IN VARCHAR2, Key IN
VARCHAR2)
      RETURN Boolean AS
      BEGIN
      .......
      END Contains;
```

At step 204, the domain expert defines and codes (1) implementations for the index routines and (2) routines that implement the operator using an index object of the non-native index type. This coding is typically performed in a third generation programming language such as Pascal, C, or C++. These routines are compiled into executable modules that can be statically linked with the database server code, dynamically linked with the database server code, or executed as separate processes when invoked by the database server.

For example, the domain expert of the text index may create the DDL routines to build the text index on a text column ("text_create"), remove the index information when the index is dropped ("text_drop"), and truncate the text index when the base table is truncated ("text_truncate"). These implement the i_create, i_drop, and i_truncate index routines for a specific type of non-native index.

The DML routines created by the domain expert may include routines to manage the text index when rows are inserted to the base table ("text_insert"), deleted from the base table ("text_delete") or updated in the base table ("text_update"). These routines implement the i_insert, i_delete, and i_update index routines for the non-native index.

The QP routines for the text index may include the routines text_open, text_start, text_fetch, and text_close which implement the index routines used to access the text index to retrieve rows of the base table that satisfy an operator predicate passed to the routines from the database server. In the present example, the Contains( . . . ) predicate of a query received by the database server is passed from the database server to the query routines which then access the text index and return the qualifying rows to the system.

According to one embodiment of the invention, the names of all index routines are fixed, and the domain expert must supply routines which implement all of the index routines except the i_joinfetch function. An implementation of the i_joinfetch function must be supplied only when the index supports a "join" indexed function.

At step 206, the domain expert creates a data type that associates the routines created in step 204 with the index routines to which they correspond. This data type brings together all the routines for managing and accessing the index object.

For example, a data type named "OTextIType" which brings together all of the routines for managing and accessing the text index may be created as follows:

```
CREATE TYPE OTextIType
(
--DDL Routines
PROCEDURE i_create(iargs Iargs, parms VARCHAR2(1024)) AS
      EXTERNAL NAME'/text/text_create' WITH CONTEXT;
PROCEDURE i_drop(iname VARCHAR(30)) AS EXTERNAL NAME
      '/text/text_drop' WITH CONTEXT;
PROCEDURE i_truncate(iname VARCHAR(30)) AS EXTERNAL
      NAME '/text/text_truncate' WITH CONTEXT;
--DML Routines
PROCEDURE i_insert(iargs, Iargs, rowid ROWID, new Ivals) AS
      EXTERNAL NAME '/text/text_insert' WITH CONTEXT;
PROCEDURE i_delete(iargs, Iargs, rowid ROWID, oldval Ivals) AS
      EXTERNAL NAME '/text/text_delete' WITH CONTEXT;
PROCEDURE i_update(iargs, Iaregs, rowid ROWID, oldval Ivals,
      newval Ivals) AS EXTERNAL NAME '/text/text_update' WITH
      CONTEXT;
-Query Processing Routines - for operators
FUNCTION i_open(iargs Iargs, opinfo Iops) RETURN Ihdl AS
      EXTERNAL NAME '/text/text_open' WITH CONTEXT RETURN
      Idhl;
PROCEDURE i_start(ihdl Ihdl) AS EXTERNAL NAME
      '/text/text_start' WITH CONTEXT;
FUNCTION i_fetch(ihdl Ihdl, ancdata OUT VARRY(30) OF TYPEANY)
      RETURN ROWID AS EXTERNAL NAME '/text/text_fetch' WITH
      CONTEXT RETURN ROWID;
PROCEDURE i_close(ihdl Ihdl) AS EXTERNAL NAME
      'text/text_close' WITH CONTEXT;
);
```

The WITH CONTEXT option allows the external routines to rely on execution services provided by the database system that handle errors and allocate memory.

At step 208, an Indextype schema object is created for the non-native index type. The Indextype schema object is associated with its implementation provided by the data type declared in step 206. The schema object declaration indicates both the data type created at step 206 and the operator functions created at step 204. For example, a schema object named "OTextI" for a text index that supports the Contains operator may be created by the declaration:

CREATE INDEXTYPE OTextI
OPERATORS Contains(VARCHAR2, VARCHAR2)
AS TYPE OTextIType;

After the statements generated in steps 206 and 208 are submitted to the database server, the non-native index type is considered registered with the database. That is, the database server is aware of the operators that can be used with an OTextI index type and the location of the routines that must be invoked to create and manage an OTextI index object.

INHERITANCE

According to an alternate embodiment, the domain expert may define the data type for the non-native index using an inheritance mechanism. According to this embodiment, the database system defines a base type, BaseIType with default implementations of all the index routines. The default actions could be, for example, to simply raise an error. Domain experts then derive a data type for their specific index type from the base type, and define routine implementations that override the default implementations of the index routines. The domain expert can override the implementations of any or all of the methods in the BaseIType object class. The use of inheritance enforces the interface for the index routines since the domain expert will derive the interface from the base type.

USE OF EXTENSIBLE INDICES

Once a non-native index type is registered with the database server, a client can create index objects of the non-native index type and submit queries that use the indexed operators employed by the non-native index type. In the text index example, a user may define text indices on text columns and use the associated Contains operator to query text data.

For example, a client may define a table "EMP" using the definition:

CREATE TABLE Emp (name VARCHAR2(64), id INTEGER, resume VARCHAR2(2000));

The client may then cause a text index to be created on the resume column by submitting to the database server the statement:

CREATE INDEX resumeI ON Emp(resume) INDEX-TYPE IS OTextI;

During the creation of the text index, the database server invokes the create routine supplied by the domain expert (i.e. "text_create"). Once the text index is created on the resume column, the database server may invoke the QP routines provided by the domain expert to use the text index during the processing of queries on the base table. For example, the text data in the resume column can be queried as:

SELECT * FROM Emp WHERE Contains(resume, 'Oracle');

The text index on the resume column may be used to efficiently process the query. To use the text index, the database server invokes the QP routines associated with the OTextI Indextype.

TUPLE-BASED INDEX MODELS

As mentioned above, the domain expert is responsible for coding the routines that manage and interpret index objects. It has been discovered that the entries in virtually all types of index structures can be represented by tuples. For example, document indexing involves parsing text and inserting words ("tokens") into an inverted index. Such index entries typically have the following logical form (token, <docid, data>)

where "token" is the key, "docid" is a unique identifier for the related document, and "data" is a segment containing Information Retrieval ("IR") specific quantities. For example, a probabilistic IR scheme could have a data segment with token frequency and occurrence list attributes. The occurrence list identifies all locations within the related document where the token appears. Assuming an IR scheme such as this, each index entry would be of the form:

(token, <docid, frequency, occlist> . . . )

The following sample index entry for the token Archimedes illustrates the associated logical content.

(Archimedes, <5, 3, [7 62 225]>, <26, 2, [33, 49]>, . . . )

In this sample index entry, the token Archimedes appears in document 5 at 3 locations(7, 62, and 225), and in document 26 at 2 locations(33 and 49). Note that the index would contain one entry for every document with the word Archimedes.

Because the index entries of an index object can be represented as tuples, the routines implemented by the domain expert to store the index entries may employ the same interface as the routines used to implement the native access methods. According to one embodiment of the invention, the interface of the routines used to access index-only tables is used for the routines that implement the index object tables.

INDEX-ONLY TABLES

An index-only table is similar to a conventional table with an index on one or more of its columns. However, an index-only table differs from a standard table in that instead of maintaining two separate data containers for the table and its index, the database server only maintains a single index with no actual base table.

As with conventional tables, clients manipulate index-only tables by submitting statements to the database server in the database language supported by the database server. However, all operations on the data in the table are performed by manipulating the corresponding index.

Each entry in the index for an index-only table contains both the encoded key value and the associated column values for the corresponding row. That is, rather than having row ROWID as the second element of the index entry, the actual data from the corresponding row is stored in the index. Thus, every index entry for an index-only table has the form<primary_key_value, non_primary_key_column_values>.

Index-only tables are suitable for accessing data via primary key or via any key which is a valid prefix of the primary key. Also, there is no duplication of key values as only non key column values are stored with the key.

ROW OVERFLOW

For index-only tables, index entries can become very large, since they are made up of<key, non_key_column_values>tuples. If index entries get very large, then the leaf nodes may have to store one row or row piece, thereby destroying the dense clustering property of the index.

To overcome this problem, a Row Overflow Area clause may be used. Specifically, users specify an overflow tablespace as well as a threshold value. The threshold is specified as percentage of the block size. If the row size is greater than the specified threshold value, then the non-key column values for the row that exceeds the threshold are stored in the specified overflow tablespace. When this occurs, the index entry contains<key, rowhead>pair, where the rowhead contains the beginning portion of the rest of the columns. The entry is like a regular row-piece, except that an overflow row-piece contains the remaining column values.

INDEX-ONLY TABLE OPERATIONS

According to one embodiment, the SQL statement "CREATE TABLE" used to create conventional tables may be used to create index-only tables. However, when used to create index-only TABLES, the following additional information is supplied:

An ORGANIZATION INDEXED qualifier is used to indicate this is an index-only table.

A primary key is specified through a column constraint clause (for a single column primary key) or a table constraint clause (for a multiple column primary key). A primary key must be specified for index-only tables.

An optional row overflow specification clause that specifies overflow area physical attributes may also be supplied. A data row is placed in the overflow tablespace if the size of the data row exceeds the threshold. The threshold is specified as percentage of the block size.

For example, an index-only table can be created to model inverted index for an IR client in the following manner:

```
CREATE TABLE docindex
    (   token char(20),
        doc_oid integer,
        token_frequency smallint,
        token_occurence_data varchar(512),
        CONSTRAINT pk_docindex PRIMARY KEY (token,
doc_oid))
    ORGANIZATION INDEX TABLESPACE text_collection
    PCTTHRESHOLD 20
    OVERFLOW TABLESPACE text_collection_overflow;
```

In the above definition, the ORGANIZATION INDEXED qualifier indicates that docindex is an index-only table, where the row data reside in an index defined on columns that designate the primary key (token, doc_id) for the table. The overflow clause indicates that pieces of data rows which exceed 20% of the block size, will be placed in the text_collection_overflow tablespace.

No syntax changes are required to manipulate index-only tables. A user can use an index-only table in place of a regular table in SQL INSERT, SELECT, DELETE, and UPDATE statements. However, for index-only tables the rows are stored in the B-tree itself and these rows do not have a row identity (ROWID). Thus, an index-only table does not support implicit ROWID column and hence users cannot perform ROWID based-retrieval on index-only tables. Instead, users access the rows of index-only tables using the primary key.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for storing data in a database, the method comprising the steps of:
    receiving a row of data from a client;
    wherein said row includes a set of one or more key columns and a set of one or more non-key columns;
    identifying a key value in said set of one or more key columns of said row of data;
    locating an index in said database that is built on said set of one or more key columns;
    wherein said index has a plurality of branch levels populated with branch nodes;
    identifying a leaf node in said index by traversing each branch level of said plurality of branch levels by comparing said key value to a key value associated with a branch node at said each branch level; and
    storing in said leaf node an index entry that includes said key value and all other values in said row of data.

2. The method of claim 1, wherein the step of storing includes storing at least a portion of said other values in an overflow area.

3. The method of claim 2, wherein the step of storing at least a portion of said other values includes storing at least a portion of said other values in a user specified overflow area.

4. The method of claim 1, the method further comprising the steps of:
    wherein the leaf node resides on a storage block that has space available to entirely store the row of data,
    determining whether the row of data exceeds a threshold size, and
    if the row of data exceeds said threshold size, then storing a portion of said row of data in an overflow area.

5. The method of claim 4, wherein the step of determining whether the row of data exceeds a predetermined size includes determining whether the row of data exceeds a user specified threshold size.

6. The method of claim 5, wherein the step of determining whether the row of data exceeds a user specified threshold includes determining whether the row of data exceeds a user specified percentage of a block size.

7. The method of claim 1 wherein said step of identifying a leaf node includes finding said leaf node in a B-tree index.

8. A method for retrieving data from a database for a user-supplied key, the method comprising the steps of:
    identifying an index entry in a leaf node of an index based on said user-supplied key;
    wherein at least a portion of said index entry resides on a storage block that may be used to store up to a maximum amount of data;
    determining whether the index entry has a size that exceeds a row threshold that is less than said maximum amount;
    if the index entry does not have a size that exceeds the row threshold, then reading a row of data from the index entry; and
    if the index entry has a size that exceeds the row threshold, then reading a first portion of a row of data from the index entry, and a second portion of the row of data from an associated row overflow area.

9. The method of claim 8, wherein the step of reading a first portion and a second portion includes reading the second portion of the row of data from a user specified row overflow area.

10. A method for retrieving data from a database for a user-supplied key, the method comprising the steps of:
    receiving one or more SQL statements requesting data from said database;
    in response to receiving said one or more SQL statements, performing the steps of:
    identifying an index entry in a leaf node of an index based on said user-supplied key;
    wherein at least a portion of said index entry resides on a storage block that may be used to store up to a maximum amount of data;
    determining whether the index entry has a size that exceeds a row threshold that is less than said maximum amount;
    if the index entry does not have a size that exceeds the row threshold, then reading a row of data from the index entry; and
    if the index entry has a size that exceeds the row threshold, then reading a first portion of a row of data from the index entry, and a second portion of the row of data from an associated row overflow area.

11. A computer-readable medium carrying one or more sequences of one or more instructions for storing data in a database, wherein the execution of the one or more sequences of the one or more instructions causes the one or more processors to perform the steps of:
    receiving a row of data from a client;
    wherein said row includes a set of one or more key columns and a set of one or more non-key columns;

identifying a key value in said set of one or more key columns of said row of data;

locating an index in said database that is built on said set of one or more key columns;

wherein said index has a plurality of branch levels populated with branch nodes;

identifying a leaf node in said index by traversing each branch level of said plurality of branch levels by comparing said key value to a key value associated with a branch node at said each branch level; and storing in said leaf node an index entry that includes said key value and all other values in said row of data.

12. The computer-readable medium of claim 11, wherein the step of storing includes storing at least a portion of said other values in an overflow area.

13. The computer-readable medium of claim 12, wherein the step of storing at least a portion of said other values includes storing at least a portion of said other values in a user specified overflow area.

14. A computer-readable medium carrying one or more sequences of one or more instructions for retrieving data from a database for a user-supplied key, wherein the execution of the one or more sequences of the one or more instructions causes the one or more processors to perform the steps of:

identifying an index entry in a leaf node of an index based on said user-supplied key;

wherein at least a portion of said index entry resides on a storage block that may be used to store up to a maximum amount of data;

determining whether the index entry has a size that exceeds a row threshold that is less than said maximum amount;

if the index entry does not have a size that exceeds the row threshold, then reading a row of data from the index entry; and if the index entry has a size that exceeds the row threshold, then reading a first portion of a row of data from the index entry, and a second portion of the row of data from an associated row overflow area.

15. The computer-readable medium of claim 14, wherein the step of reading a first portion and a second portion includes reading the second portion of the row of data from a user specified row overflow area.

16. A database system, comprising:

a processor, a memory coupled to said processor;

a database;

an index that has a plurality of branch levels populated with branch nodes, said index is built on a set of one or more key columns of a row of data;

said processor being configured to identify a leaf node in an index based on a key value by traversing each branch level of said plurality of branch levels;

said processor being configured to traverse each branch level of said plurality of branch levels by comparing said key value to a key value associated with a branch node at said each branch level; and said processor being configured to store in said leaf node an index entry that includes said key value and all other values in said row of data.

17. The database system of claim 16, wherein said processor is configured to store said index entry in said leaf node by storing at least a portion of said other values in a user specified overflow area.

18. The database system of claim 16 wherein:

said processor is configured to store at least a portion of said index entry in a storage block that may be used to store up to a maximum amount of data;

said processor is configured to identify the index entry in said leaf node based on a user-supplied key;

said processor is configured to determine whether the index entry has a size that exceeds a row threshold that is less than the maximum amount of data;

said processor is configured to read a row of data from the index entry if the index entry has a size that exceeds the row threshold; and said processor is configured to read a first portion of a row of data from the index entry, and a second portion of the row of data from an associated row overflow area if the index entry has a size that exceeds the row threshold.

19. The database system of claim 18, wherein said processor is configured to read the second portion by reading a user specified row overflow area.

20. A database system that includes an index stored on a storage device, wherein:

the database system has no separately stored table that corresponds to the index;

the index is built on key values contained in rows that are stored in the index itself;

entries within the index include both a key value for a row and all other values for the row; and the index has plurality of branch levels populated with branch nodes;

the database system is configured to identify a leaf node containing a particular row by traversing each branch level of said plurality of branch levels; and the database system is configured to traverse each branch level by comparing said key value for the row to a key value associated with a branch node at said each branch level.

21. The computer-readable of claim 11, the method further comprising the steps of:

wherein the leaf node resides on a storage block that has space available to entirely store the row of data, determining whether the row of data exceeds a threshold size, and if the row of data exceeds said threshold size, then storing a portion of said row of data in an overflow area.

22. The computer-readable of claim 21, wherein the step of determining whether the row of data exceeds a predetermined size includes determining whether the row of data exceeds a user specified threshold size.

23. The computer-readable of claim 22, wherein the step of determining whether the row of data exceeds a user specified threshold includes determining whether the row of data exceeds a user specified percentage of a block size.

24. The computer-readable of claim 11, wherein said step of identifying a leaf node includes finding said leaf node in a B-tree index.

* * * * *